Sept. 12, 1939.     H. J. HAMMERLY     2,173,062
BUS BAR CONDUIT SYSTEM OF POWER DISTRIBUTION
Filed Sept. 14, 1937     2 Sheets-Sheet 1

INVENTOR
Herman J. Hammerly
BY
ATTORNEY

Sept. 12, 1939.    H. J. HAMMERLY    2,173,062
BUS BAR CONDUIT SYSTEM OF POWER DISTRIBUTION
Filed Sept. 14, 1937    2 Sheets-Sheet 2
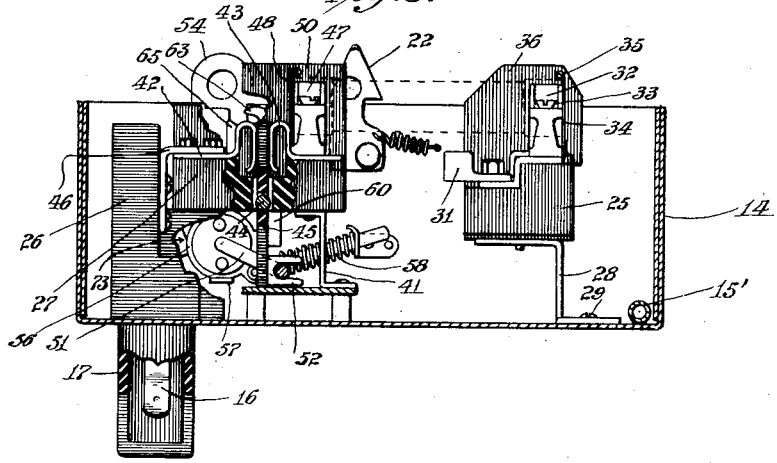
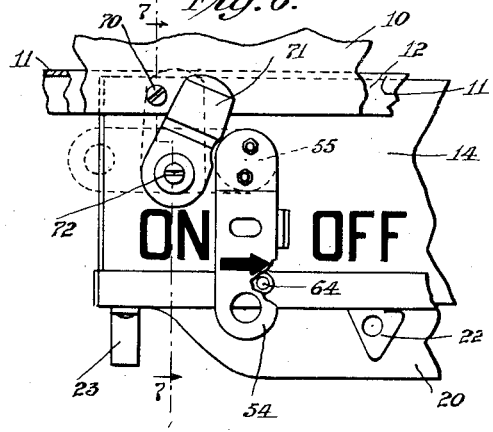
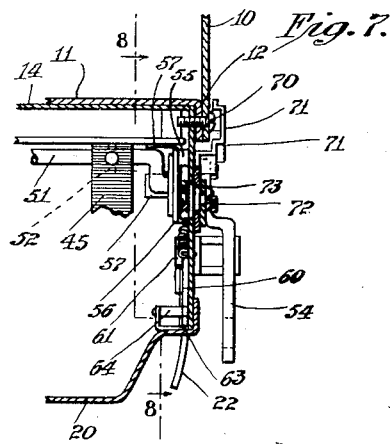
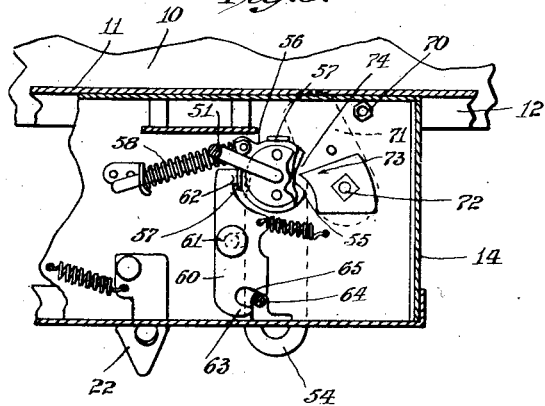
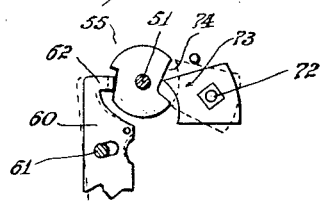
INVENTOR
Herman J. Hammerly
BY
ATTORNEY

UNITED STATES PATENT OFFICE 2,173,062

BUS BAR CONDUIT SYSTEM OF POWER DISTRIBUTION

Herman J. Hammerly, New Britain, Conn., assignor to The Trumbull Electric Manufacturing Company, Plainville, Conn., a corporation of Connecticut Application September 14, 1937, Serial No. 163,735

7 Claims. (Cl. 200—50)

My invention relates to a branch circuit take-off device or connector and the main object is to provide a device by which the circuit may be interrupted outside of the conduit.

A special object is to adapt a safety type switch to a bus bar conduit system.

Another object is to prevent opening the circuit at the bus bars.

Another object is to prevent access to the live parts of the system except when the branch circuit is electrically disconnected from the bus bars.

Other objects of improved detail will be seen as the specification develops.

In its preferred form the branch connector takes the form of a switch box hinged to the conduit and provided with plug blades or "stabs" adapted to pass through a wall of the conduit to engage the bus bars inside. The switch box has a cover and is provided with interlocking mechanism which normally prevents the opening of the cover when the circuit is closed. The box itself is secured to the conduit by a screw or other device and can not be opened or removed until the switch parts are in the "off" position. This greatly facilitates insertion when the switch is mounted upside down. The plug blades are protected by non-arcing shields so that there is no danger of damage either to the blades or to the bus bars. The details by which the switch box is secured to the conduit are also important.

Fig. 5 is a longitudinal sectional and side view of a connector device.

Fig. 6 is an outside side view showing the switch actuator and safety device in the "off" position.

Fig. 7 is a cross sectional view on the plane of line 7—7 of Fig. 6 showing the switch actuating device.

Fig. 8 is an inside and sectional view on the plane of the line 8—8 of Fig. 7.

Fig. 9 is a fragmentary view showing interlocking parts.

Figure 1:
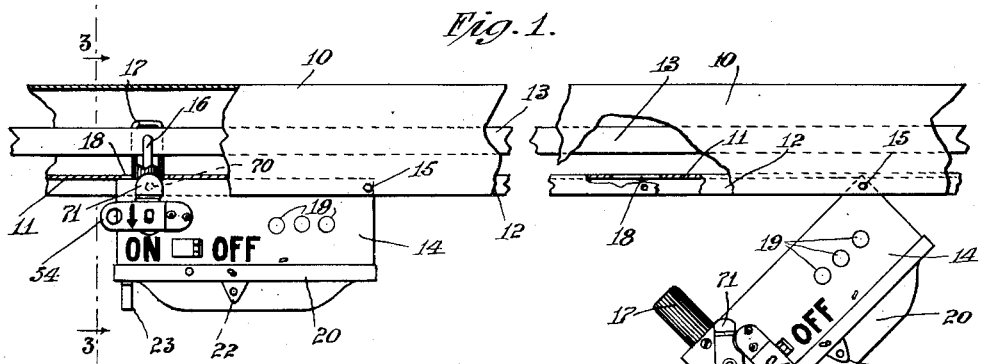
Fig. 1 is a side view and partial section showing a bus bar conduit with two branch circuit connectors, one of them being shown in the closed circuit or "on" position and the other in the open circuit or "off" position.

The conduit or housing body 10 is preferably formed of sheet metal in channel form and provided with a cover portion 11. The edges of these two members overlap at 12 and are suitably secured together preferably in a detachable manner.

The bus bars 13, 13 may be of any suitable form, preferably flat and arranged edgewise in the conduit and supported in such a manner as to be insulated from each other. Only a horizontal run of the conduit is shown but it will be understood that it may be arranged vertically or otherwise.

The conductors for each branch circuit (not shown) are connected electrically and mechanically through the medium of a connector or take-off device in the form of a switch box 14 which is hinged to the overlapping flanges 12 through the medium of a hinge bolt 15 which passes through a bearing tube 15' inside of and secured to the box. The box is provided with a number of blades, jaws or stabs 16 which are adapted to engage the sides of the bus bars to provide electrical connection. Each blade is partially enclosed in a slotted insulating tube 17 which surrounds the sides of the blade. The closure plate 11 is provided with openings 18 through which the contact blades and arc suppressing tubes pass as the switch box is swung from the disengaged to the engaged position. The branch circuit conductors are led into the switch box through suitable openings 19.

The switch box may be closed on the side toward the conduit but is open at the opposite side and provided with a cover 20 which is hinged at 21. The spring latch 22 serves to hold the cover closed. A handle 23 is provided for opening the cover and also for pulling down on the movable end of the switch box to disengage the contact blades from the bus bars. A hinged and sliding bar or strap 24 limits the opening movement of the cover.

Inside the box are arranged the circuit protecting fuses and the switch mechanism which controls the branch circuit. The fuse supporting clamps, the circuit terminals and the switch members are carried by three blocks of insulating material 25, 26 and 27. Block 25 is supported on a Z-shaped bracket 28 which is secured to the bottom of the box by a number of screws 29, each screw passing through a slot 30 so that the block and its support may be adjusted toward and from the other block. This block 25 supports the terminal lugs 31 and the attached fuse clamp sockets 32. Each fuse socket is provided with a set screw 33, such construction being shown in the Rowe Patent 1,971,623.

Insulating barriers 36 may be provided between adjacent fuse holders.

In the opposite end of the switch box is mounted the insulating block 26 which is fastened by a number of screws such as 40 to the bottom of the box. The contact blades 16 are secured to this block 26 and project into the insulating arc suppressing tubes 17 which are secured in a suitable manner to the block 26 or to the box or both. The switch mechanism per se is carried by the block 27 and may be of suitable form such for instance as shown in my Patent 1,889,515. This switch block 27 is supported by a bracket 41 which is secured in the bottom of the box and is connected to the block 26 in any suitable manner.

Each switch unit has two contact members 42 and 43 which are adapted to be connected electrically by a roller 44 which is loosely mounted in the insulating plunger 45. The two contact members 42 and 43 are suitably secured to the insulating block 27. Contact 42 is electrically connected with an angle piece 46 which in turn is electrically and mechanically connected with one of the contact blades 16. The other contact member 43 is connected to the fuse clamp socket 47 and the spring retaining clip 48. This clamp 47 and the clip 48 are arranged opposite the clamp member 32 and the clip 34 previously described, the distance between the clamps and clips being such as to properly accommodate and hold a fuse or other protective device of the desired capacity. Insulating guards 50 may be provided between adjacent fuse holders.

The actuating mechanism may be of suitable quick make and break type and includes a crank shaft 51 which is supported in opposite sides of the box and engaged by yokes 52 carried by the respective switch plungers.

The operating handle 54 is secured to a hub 55 which is mounted to oscillate in the side of the box and provided with a lost motion connection to the disc 56 whose lugs 57 are disposed on opposite sides of an arm of the crank shaft 51. A throwing spring 58 is connected to the disc 56 so as to operate it with a snap action in the usual manner.

A locking lever 60 is hinged at 61 and provided with a tip 62 which is adapted to interlock with the hub 55. The outer end of the latch 60 has a hook 63 for engaging a pin 64 carried by the edge of the cover. The latch 60 has an inclined tip 65 adapted to be engaged by the pin 64 as the cover is closed so as to retract the latch tip 62 from the hub 55 when the cover is closed and the switch is in the open circuit position. When the switch is in the closed circuit position the hook 63 interlocks with the pin 64 so as to prevent the cover from being open. This position of the latch 60 is permitted by the fact that the latch is provided with a slot through which the hinge pin 61 extends. The operation of this type of mechanism will be more fully understood from Patent No. 1,310,163.

Figure 2:
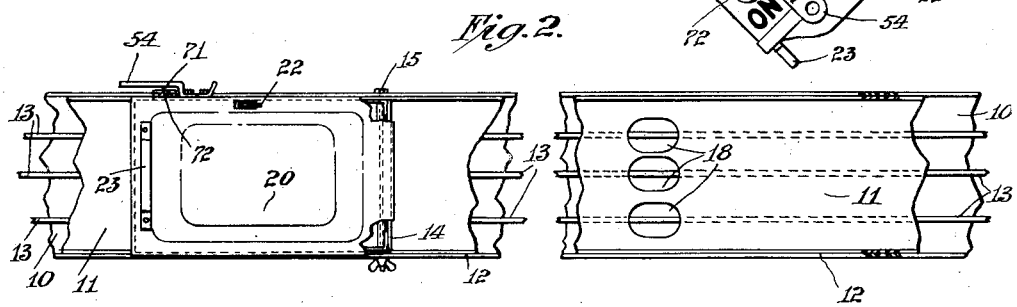
Fig. 2 is a bottom view of the same but omitting the connector which is shown "off" in Fig. 1.
Figure 4:
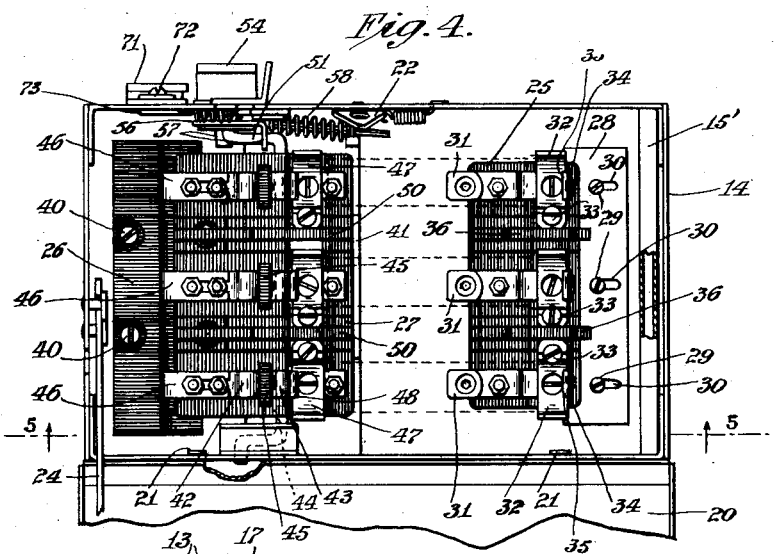
Fig. 4 is a view of the inside of a connector device with the cover open and broken away.
Figure 3:
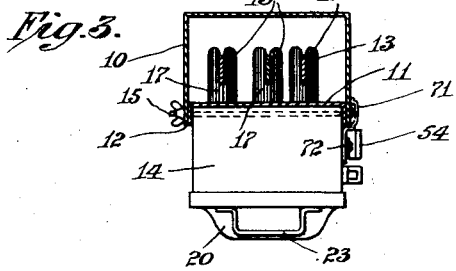
Fig. 3 is a cross sectional view on the plane of line 3—3 of Fig. 1.

When the switch box is in what may be termed the engaged position shown at the left in Figs. 1 and 2 and shown in Figs. 6 and 7, it is usually secured by means of a bolt or screw 70 which passes through the flanges 12 and through a wall of the switch box. When this screw is in place it is, of course, impossible to move the switch box from the position shown at the left in Fig. 1 to the position shown at the right in Fig. 1. In other words, the switch blades cannot be disengaged from the bus bars and the only way in which the circuit can be opened is by operating the handle 54 and the switch mechanism. On account of the damage which may be done not only to the bus bars and the connected contact blades or jaws but also to the various devices connected in the branch circuits when the circuit is broken by separating the blades from the bus bars, I have provided means which makes it necessary to break the branch circuit by means of the switch mechanism before it is possible to disengage the blade 16 from the bus bars. This consists in guarding the fastening screw 70 by means of a plate 71 which is hinged at 72 to a wall of the box and provided on the inside of the box with a lug 73.

When the switch is in the closed circuit or "on" position this lug 73 is prevented from turning by reason of its proximity to the hub 55 of the switch handle. It is therefore impossible to get at the screw 70 and therefore impossible to move the switch box from the engaged to the disengaged position.

When the switch is opened however a recess 74 is brought into position opposite the tip of the lug 73 so that the guard plate 71 may be swung from the position shown at the left in Fig. 1 to that shown at the right in Fig. 1 and in Figs. 6 and 8, in which position the fastening screw 70 is exposed and may be removed so as to permit the switch box to be moved from the engaged to the disengaged position. By removing the hinge bolt 15 and the fastening screw 70 the switch box with its mechanism may be removed from the bus bar conduit. It will be understood, however, that it first will be necessary to open the branch circuit before this can be accomplished.

I claim:

1. In a bus bar conduit system, a switch box hinged to the conduit and provided with contact blades for engaging the bus bars in the conduit, switch mechanism in the box for controlling a branch circuit, means for holding the switch box in place and interlocking means between the switch mechanism and said holding means for concealing the holding means when the switch mechanism is in the closed circuit position.

2. In a bus bar conduit system, a switch box hinged to the conduit and provided with contact blades for engaging the bus bars in the conduit, switch mechanism in the box for controlling a branch circuit, means for holding the switch box in place, a cover hinged to the box, interlocking means to prevent the opening of the cover when the switch is closed and interlocking means between the switch mechanism and said holding means for preventing the release of the holding means when the switch mechanism is in the closed circuit position.

3. In a bus bar conduit system, a switch box provided with contact blades for engaging the bus bars in the conduit, switch mechanism in the box for controlling a branch circuit, means for holding the switch box in place on the conduit, a cover for the box, interlocking means to prevent the opening of the cover when the switch is closed and interlocking means for preventing the release of the switch box when the switch mechanism is in the closed circuit position.

4. A branch circuit connector for a bus bar conduit system having a box provided with a cover and containing switch mechanism, means for actuating the switch mechanism, means for securing the box to a conduit, a guard concealing and preventing access to said securing means when the switch mechanism is in the closed circuit position and means actuated by the switch actuating means for exposing said guard when the circuit is opened.

5. In a bus bar conduit connector box, switch mechanism and branch terminals within the box, contact blades projecting from the box to engage bus bars in the conduit, means for locking the box to the conduit with the blades engaging the bus bars, means for actuating the switch mechanism and means for concealing and preventing the release of the locking means while the circuit through the branch terminals is closed.

6. A bus bar conduit connector having a box, a switch in the box, means for securing the box to the conduit, a guard plate for concealing the securing means while the circuit through the switch is closed, and means for retracting the guard plate and disclosing the securing means.

7. In a bus bar conduit system, a switch box hinged to the conduit and containing branch circuit protective devices and circuit making and breaking mechanism, said box having contact blades adapted to enter the conduit and engage the bus bars therein, means in addition to the hinge for holding the switch box in position with the blades engaging the bus bars in the conduit, a lever on the outside of the box for actuating the circuit making and breaking mechanism within the box and interlocking mechanism coacting with the holding means and with the circuit making and breaking mechanism for preventing release of the holding means when the switch mechanism is in the closed circuit position.

HERMAN J. HAMMERLY.